(12) United States Patent
Lee et al.

(10) Patent No.: US 7,978,289 B2
(45) Date of Patent: Jul. 12, 2011

(54) FLEXIBLE DISPLAY DEVICE

(75) Inventors: Sin-Doo Lee, Seoul (KR); Yeun-Tae Kim, Seoul (KR)

(73) Assignees: Samsung Mobile Display Co., Ltd., Suwon-si, Gyeonggi-do (KR); Seoul National University Industry Foundation, Seoul (KR)

( * ) Notice: Subject to any disclaimer, the term of this patent is extended or adjusted under 35 U.S.C. 154(b) by 772 days.

(21) Appl. No.: 11/505,934

(22) Filed: Aug. 18, 2006

(65) Prior Publication Data
US 2007/0040972 A1    Feb. 22, 2007

(30) Foreign Application Priority Data

Aug. 18, 2005   (KR) .................. 10-2005-0075876

(51) Int. Cl.
G02F 1/1333    (2006.01)
G02F 1/1335    (2006.01)
G02F 1/1337    (2006.01)

(52) U.S. Cl. .......... 349/123; 349/96; 349/122; 349/158; 349/162

(58) Field of Classification Search .......... 349/123, 349/124, 158
See application file for complete search history.

(56) References Cited

U.S. PATENT DOCUMENTS

| | | | | |
|---|---|---|---|---|
| 6,014,197 A | * | 1/2000 | Hikmet | 349/201 |
| 6,057,902 A | * | 5/2000 | Angelopoulos et al. | 349/129 |
| 7,375,783 B2 | * | 5/2008 | Kizu et al. | 349/123 |
| 2001/0004279 A1 | * | 6/2001 | Sako et al. | 349/158 |
| 2005/0237471 A1 | * | 10/2005 | Kawamura | 349/158 |
| 2005/0275778 A1 | * | 12/2005 | Cho et al. | 349/114 |

FOREIGN PATENT DOCUMENTS

| | | | | |
|---|---|---|---|---|
| JP | 57192926 A | * | 11/1982 | |
| JP | 01243025 A | * | 9/1989 | |
| JP | 03211523 A | * | 9/1991 | |
| JP | 05088177 A | * | 4/1993 | |
| JP | 07-120742 | | 5/1995 | |
| KR | 10-2000-0021263 | | 4/2000 | |

* cited by examiner

*Primary Examiner* — Michelle R Connelly Cushwa
(74) *Attorney, Agent, or Firm* — Lee & Morse, P.C.

(57) ABSTRACT

A flexible display device may include a first panel including a multifunction film, a second panel arranged facing the first panel with a gap therebetween, the second panel including a substrate and electrodes formed on the substrate, and an electro-optical active layer disposed in the gap between the first panel and the second panel. The multifunction film may perform at least two of the following functions: aligning molecules in the electro-optical active layer, protecting the electro-optical active layer, keeping the thickness of the electro-optical active layer uniform, and serving as a flexible substrate.

23 Claims, 16 Drawing Sheets

12d   23

FLEXIBLE DISPLAY DEVICE

BACKGROUND OF THE INVENTION

1. Field of the Invention

The invention relates to flexible display devices.

2. Description of the Related Art

Flat panel displays, e.g., liquid crystal displays (LCDs) and an organic light emitting diode (OLED) displays may be used, e.g., in notebook computers, monitors, television sets, etc., in place of twisted nematic (TN) LCDs, which were generally employed in small display devices, e.g., wristwatches and electronic calculators in the 1970s. Although LCDs, which are relatively light-weight and generally consume relatively low amounts of power, are currently being employed in portable information display devices, an advanced product that is lighter and/or more flexible is desired.

Most of the currently-available portable display devices, which employ glass substrates, have poor flexibility. LCDs and OLED displays generally involve complicated processing steps. For example, fabrication of LCDs generally involves alignment of a liquid crystal layer, cell gap formation, etc., and fabrication of OLED displays generally involves treatment of an organic light emitting layer for increasing the emission efficiency and the lifetime, encapsulation of the organic light emitting layer, etc.

Technology for forming a liquid crystal active layer by selective illumination of ultraviolet light (UV) onto a liquid crystal polymer complex disposed on a plastic substrate is being considered. However, such a UV illumination method employs a specific polymer material, a specific liquid crystal material, and a specific UV light having a limited wavelength range, and a thickness of the liquid crystal active layer may not be kept uniform, and the size of pixels may not be adjustable. Also, because currently available plastic substrates have poor elasticity, a flexible display device including one or more plastic substrates may not have satisfactory flexibility.

SUMMARY OF THE INVENTION

The invention is therefore directed to flexible display devices and methods of manufacturing flexible display devices, which substantially overcome one or more of the problems due to the limitations and disadvantages of the related art.

It is therefore a separate feature of embodiments of the invention to provide a multifunction film that may perform at least two functions of, e.g., keeping a thickness of an electro-optical active layer, e.g., a liquid crystal layer, uniform, uniformly aligning molecules in the active layer, protecting the active layer from external impact, and serving as a flexible substrate.

It is therefore a separate feature of embodiments of the invention to provide a multifunction film that may be formed by a single process step.

At least one of the above and other features and advantages of the present invention may be realized by providing a flexible display including a first panel including a multifunction film, a second panel arranged facing the first panel with a gap therebetween, the second panel including a substrate and electrodes formed on the substrate, and an electro-optical active layer disposed in the gap between the first panel and the second panel.

The multifunction film may perform multiple functions including at least two of aligning molecules in the electro-optical active layer, protecting the electro-optical active layer, keeping a thickness of the electro-optical active layer uniform, and serving as a flexible substrate. The multifunction film may include a surface facing the second panel and having a geometrical structure. The geometrical structure may include a plurality of projections and at least one indentation. A height of each projection may be substantially uniform. Each projection may be rectilinear and may partition the indentation adjacent thereto. The geometric structure may be a replica.

The multifunction film may include polydimethylsilioxane (PDMS). The multifunction film may include a thermosetting resin or a light curable resin. The multifunction film may be disposed on an inner surface of the first panel. One of the first and second panels may include a reflecting member and the other of the first and second panels may include a polarizer.

The electro-optical active layer may include a material having an optical property that varies by an external stimulus.

It is therefore a separate feature of embodiments of the invention to provide a flexible display device including an alignment film having an inner surface comprising a projection and an indentation, a flexible substrate facing the alignment film with interposing a gap, a plurality of electrodes disposed on the flexible substrate, and an electro-optical active layer disposed in the gap between the alignment film and the flexible substrate, wherein the flexible film determines orientations of molecules in the active layer.

It is therefore a separate feature of embodiments of the invention to provide a flexible display device including a protection film having an inner surface including a projection and an indentation, a flexible substrate facing the protection film with interposing a gap, a plurality of electrodes disposed on the flexible substrate, and an electro-optical active layer disposed in the gap between the protection film and the flexible substrate, wherein the protection film covers and protects the active layer.

The protection film may include a thermosetting resin or a light curable resin. The protection film may include polydimethylsilioxane (PDMS). The electrodes may be at least one of arranged in stripes and in an inverse v-shaped form. The protection film may completely overlap with the electrodes. The electrodes may include an opaque material.

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Figure 1:
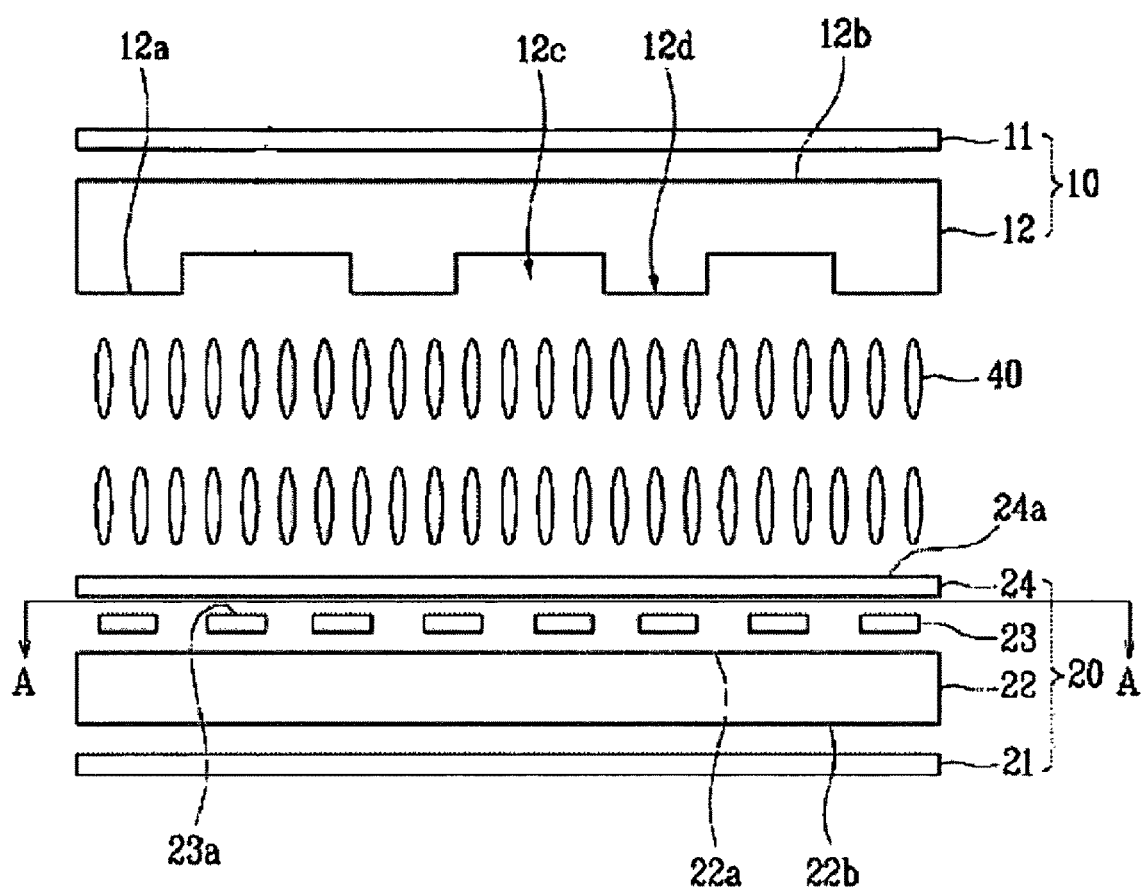
FIG. 1 illustrates an exploded cross-sectional view of a flexible liquid crystal display (LCD) according to an exemplary embodiment of the invention.

Korean Patent Application No. 10-2005-0075876, filed on Aug. 18, 2005, in the Korean Intellectual Property Office, and entitled: "Flexible Display Device," is incorporated by reference herein in its entirety.

The present invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

A flexible liquid crystal display (LCD) according to an exemplary embodiment of the invention now will be described in detail with reference to FIG. 1, which illustrates an exploded cross-sectional view of a flexible LCD employing one or more aspects of the invention.

As illustrated in FIG. 1, an exemplary flexible LCD may include a first panel 10 and a second panel 20 facing each other with gap between them, and a liquid crystal layer 40, as an example of an electro-optical layer, disposed in the gap between the first panel 10 and the second panel 20.

The first panel 10 may include a multifunction film 12 and a first polarizer 11. The multifunction film 12 may have an inner surface 12a and an outer surface 12b. The inner surface 12a may contact the liquid crystal layer 40 and the first polarizer 11 may be attached to the outer surface 12b.

The multifunction film 12 may be made of a thermosetting resin or a light curable resin, and may be elastic and/or transparent. The multifunction film 12 may be formed of or may include, e.g., polydimethylsilioxane (PDMS).

The inner surface 12a of the multifunction film 12 may have a geometrical structure. As illustrated in FIG. 1, the inner surface 12a of the multifunction film 12 may have geometric structure, e.g., indentations 12c and/or protrusions 12d formed thereon. The protrusions 12d of the multifunction film 12 may contact the second panel 20.

The second panel 20 may include a substrate 22, a second polarizer 21, a plurality of electrodes 23, and an alignment layer 24. The substrate 22 may be formed of, e.g., a transparent plastic and may have an inner surface 22a and an outer surface 22b. The second polarizer 21 may be attached to the outer surface 22b of the substrate 22, and the electrodes 23 may be formed on the inner surface 22a of the substrate 22. The electrodes 23 may be linear electrodes extending substantially parallel to each other. The alignment layer 24 may be formed on the electrodes 23.

The electrodes 23 may include various kinds of electrodes for performing various functions. For example, the electrodes 23 may include two kinds of electrodes that may be supplied with different voltages and may be alternately arranged.

The alignment layer 24 may be homeotropic, i.e., may cause alignment perpendicular to a surface thereof, so that the liquid crystal molecules in the liquid crystal layer 40 may be aligned substantially vertically, e.g., perpendicularly relative to an inner surface 24a of the alignment layer 24. The alignment layer 24 may contact the protrusions 12d of the multifunction 12 of the first panel 10.

The liquid crystal layer 40 may have positive dielectric anisotropy, and may be aligned substantially vertically to the inner surface 24a of the alignment layer 24 in the absence of an electric field. Embodiments of the invention are not limited to such an arrangement. For example, the liquid crystal layer 40 may have negative dielectric anisotropy, and may be aligned substantially horizontally.

The liquid crystal layer 40 has a thickness determined by the height of the protrusions 12d when the protrusions 12d contacting the alignment layer 24. The thickness of the liquid crystal layer 40 corresponds to the cell gap of the LCD. When the protrusions 12d have the same height H, the protrusions 12d can keep the cell gap uniform. A desired uniform cell gap may be obtained by adjusting the height of the protrusions 12d.

Optic axes of the first polarizer 11 and the second polarizer 21 may be substantially perpendicular to each other. For example, when the optic axis of the second polarizer 21 extends along a 0° direction, the optic axis of the first second polarizer 11 may extend along a 90° direction. In embodiments of the invention, the optic axes of the first and second polarizers 11 and 21 may, e.g., make an angle of about 45° relative to a length direction of the electrodes 23, and such an arrangement may enable improved or optimum light transmittance.

The second panel 20 may include a reflective plate (not shown). In embodiments that include such a reflective plate, the second polarizer 21 may be omitted.

Referring to FIG. 1, when the electrodes 23 are supplied with no voltage, the liquid crystal molecules in the liquid crystal layer 40 may maintain their initial orientations, e.g., vertical to the inner surface 24a of the alignment layer 24. In this state, linearly polarized light that has passed through one of the first and second polarizers 11, 21 may not pass through the other of the first and second polarizers 11, 21, and may thereby result in a dark state.

When the various kinds, e.g., two kinds, of the electrodes 23 are supplied with different voltages, an electric field (not shown) may be generated in the liquid crystal layer 40. Near the electrodes 23, the electric field may be substantially normal to a surface 23a of the electrodes 23. However, between the electrodes 23, the electric field may extend substantially parallel to the surface 23a of the electrodes 23. When viewing the electrodes 23 from a side facing the surface 23a, the electric field(s) may appear substantially perpendicular to the length direction of the electrodes 23.

When the liquid crystal layer 40 has positive anisotropy, the liquid crystal molecules tend to align themselves in a manner such that their long axes are parallel to the electric field. Thus, when subjected to a sufficiently strong electric field, the liquid crystal molecules may align themselves substantially parallel to a direction of the electric field.

In embodiments of the invention, the liquid crystal molecules disposed between the electrodes 23 may be re-arranged such that their long axes make an angle of about 45° with the optic axes of the first and second polarizers 11 and 21, and are substantially parallel to the surface 22a of the substrate 22. Such orientations of the liquid crystal molecules may cause retardation in the polarization of light that has passed through the one of the first and second polarizers 11, 21. The amount of retardation may depend on a thickness of the liquid crystal layer 40 (often referred to as a cell gap, which may correspond to gap illustrated in FIG. 1) and the refractive anisotropy of the liquid crystal layer 40. Thus, incident light may pass through the other of the first and second polarizers 11, 21 by adjusting the cell gap and/or the refractive anisotropy.

An exemplary multifunction film 12 and an exemplary process of manufacturing the exemplary multifunction film 12 will be described with reference to FIGS. 2A, 2B, 2C and 3.

Figure 2A:
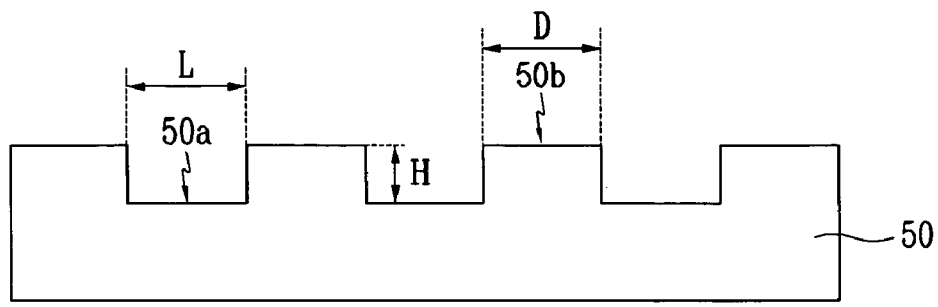
FIGS. 2A-2C illustrate cross-sectional views of stages in a process of manufacturing a multifunction film according to an exemplary embodiment of the invention.
Figure 2B:
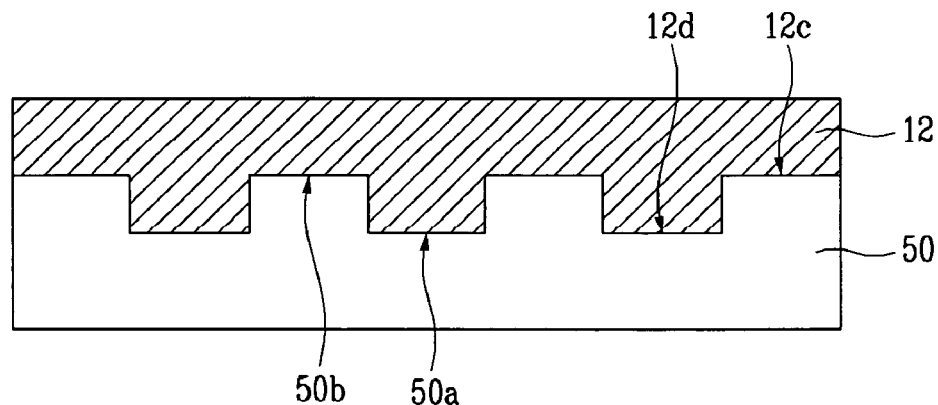
Figure 2C:
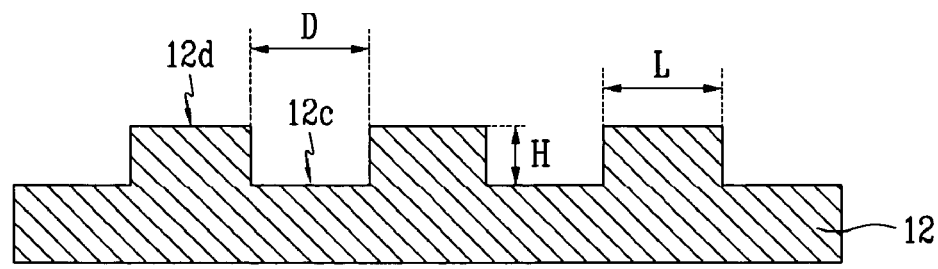
Figure 3:
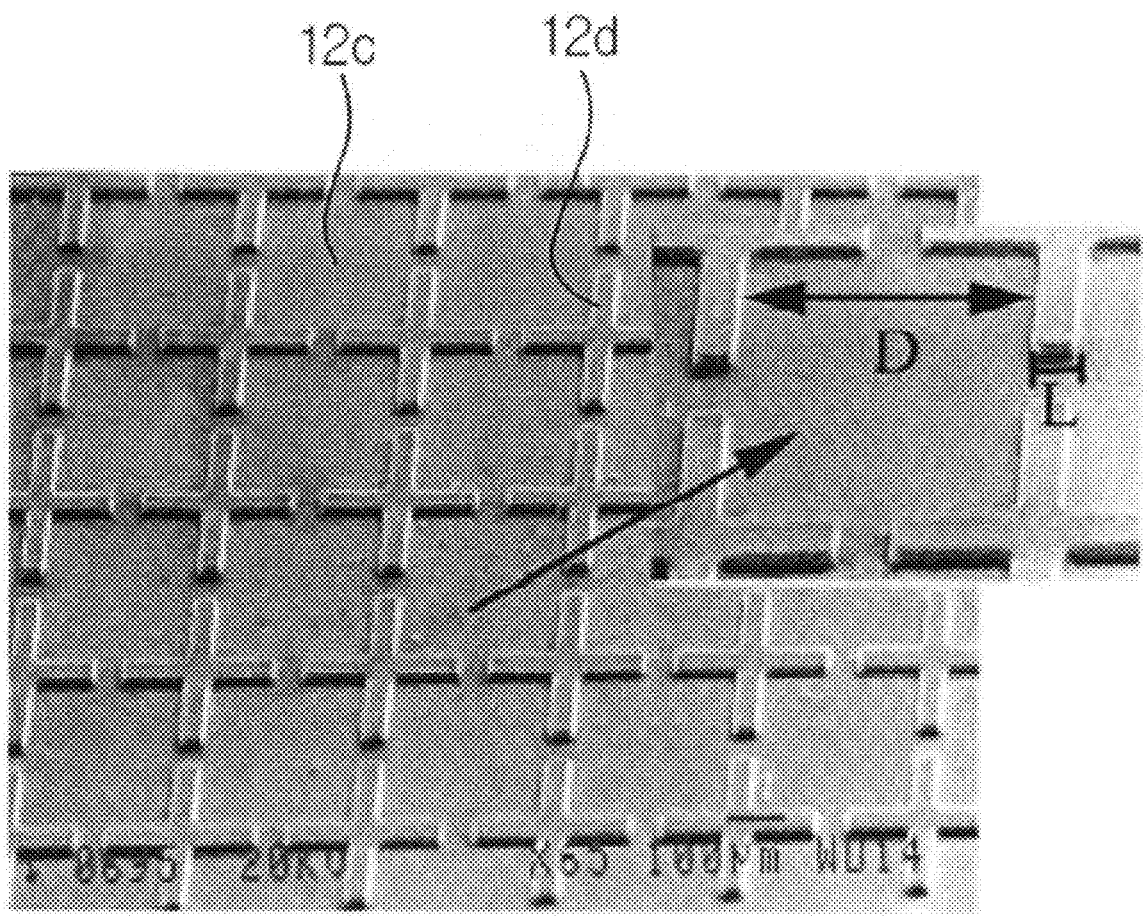
FIG. 3 illustrates a photograph, taken by a scanning electron microscope (SEM), of a multifunction film manufactured by the process illustrated in FIGS. 2A-2C.

FIGS. 2A-2C illustrate cross-sectional views that illustrate stages in a process of manufacturing a multifunction film according to an exemplary embodiment of the invention, and FIG. 3 illustrates a photograph, taken by a scanning electron microscope (SEM), of a multifunction film manufactured by the process illustrated in FIGS. 2A-2C.

The multifunction film 12 illustrated, e.g., in FIG. 1 may have two or more functions. For example, the multifunction film 12 may have at least two of the following exemplary functions: aligning the liquid crystal molecules of the liquid crystal layer 40, protecting the liquid crystal layer 40, sustaining the thickness of the liquid crystal layer 40, and providing flexibility.

As illustrated in FIG. 2A, the process of manufacturing the multifunction film 12 may begin by providing and/or fabricating a mold, i.e., molding master, cast, die, etc., having a geometrical structure corresponding to the geometrical structure to be formed on the inner surface 12a of the multifunction film 12. In embodiments of the invention, the mold may be fabricated, while, in other embodiments, a prefabricated mold may be employed. In embodiments of the invention, the mold may be intended for single use, while, in other embodiments the mold may be re-useable.

The geometrical structure on the surface of the mold 50 may include indentations 50a and/or protrusions 50b. In the following description, as illustrated in FIG. 2A, a width of the indentations 50a (or a distance between adjacent ones of the protrusions 50b) will be referred to by reference term "L," a height of the protrusions 50b relative to a base of the indentations 50a will be referred to by reference term "H," and a width of the protrusions 50b (or distance between adjacent indentations 50a) will be referred to by reference term "D."

Referring to FIG. 2B, material(s) for forming a multifunction film 12, e.g., thermosetting resin or a light curable resin in a fluid state, may be poured into the mold 50 and cured, e.g., by heat or light, to form the multifunction film 12 in a solid state. Thereafter, the multifunction film 12 may be separated from the mold 50, as illustrated in FIG. 2C.

The multifunction film 12 manufactured as described above may have indentations 12c and/or protrusions 12d that may be geometrically reversed as compared to the indentations 50a and/or protrusions 50b of the mold 50. That is, the indentations 50a of the mold 50 may form protrusions 12d on the multifunction film 12, and the protrusions 50b of the mold 50 may form indentations 12c on the multifunction film 12. Accordingly, a width of the protrusions 12d (or distance between adjacent indentations 12c) of the multifunction film 12 may be substantially equal to L, a height of the protrusions 12d may be substantially equal to H, and a width of the indentations 12c of the multifunction film 12 may be substantially equal to D.

FIG. 3 illustrates a photograph, taken by a scanning electron microscope (SEM), of a multifunction film manufactured by the process illustrated in FIGS. 2A-2C. More particularly, FIG. 3 illustrates an exemplary embodiment of a geometrical structure of a multifunction film 12 including polydimethylsilioxane (PDMS), where exemplary crosswise projections 12d are arranged periodically in rows and columns and define indentations 12c.

Figure 4A:
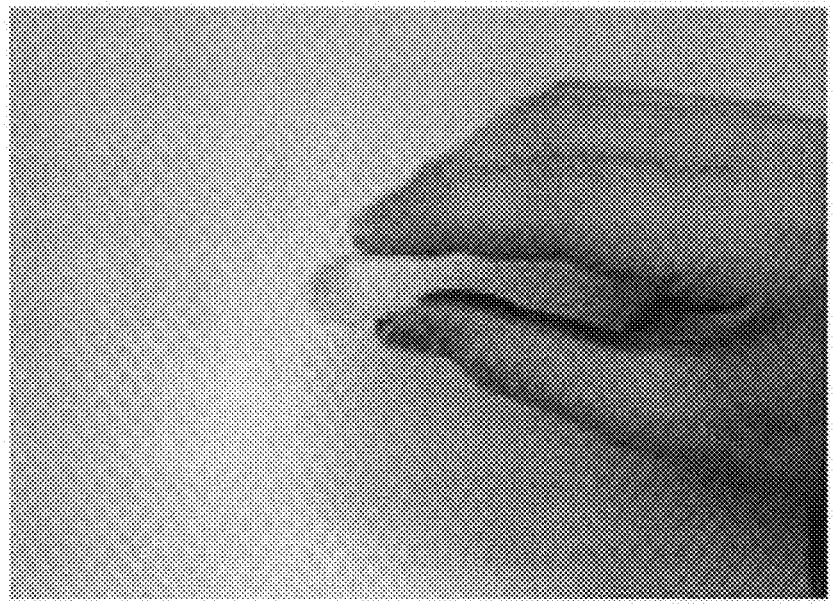
FIGS. 4A and 4B respectively illustrate photographs of a conventional flexible display device and an exemplary flexible display device according to an exemplary embodiment of the invention, in a state in which the conventional flexible display device and the exemplary flexible display device are bent by manual pressure.
Figure 4B:
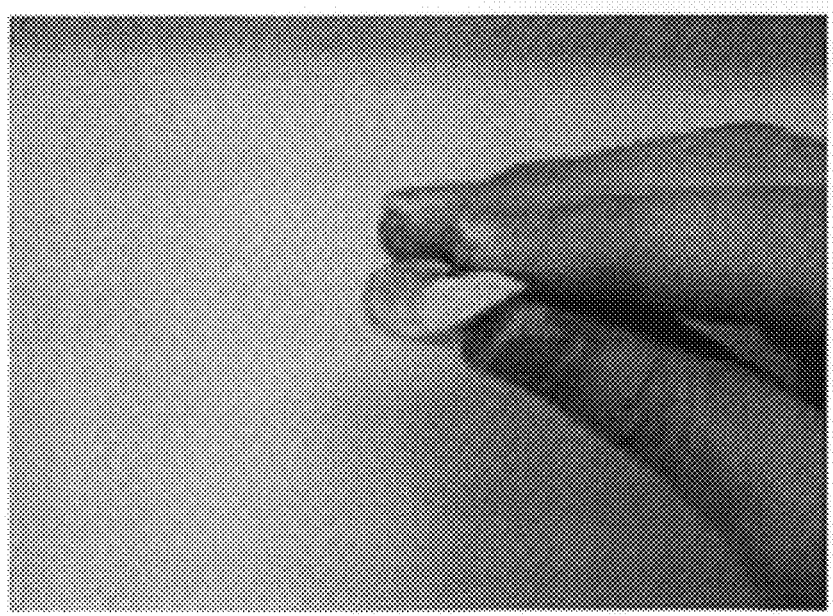
Figure 5A:
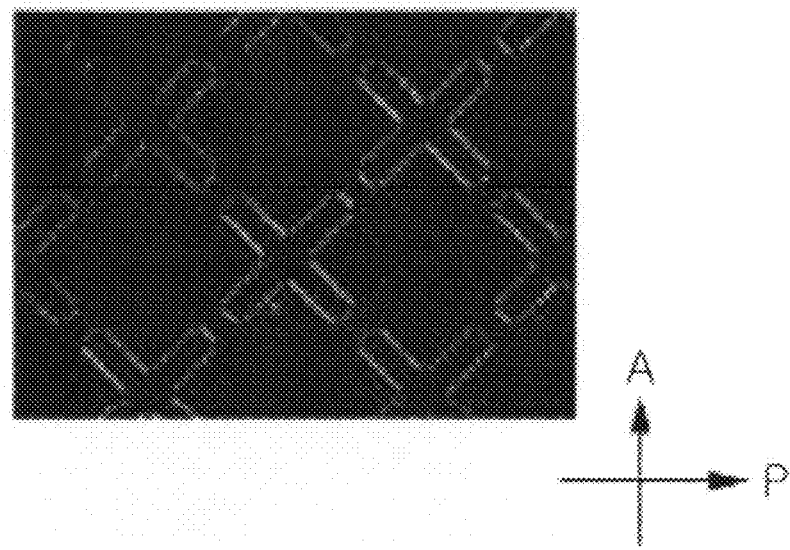
FIGS. 5A-5D, 7A-7D, 9A-9D and 11A-11D illustrate optical microscope images of flexible LCDs from above line A-A of FIG. 1 according to embodiments of the invention under the application of various voltages.
Figure 5B:
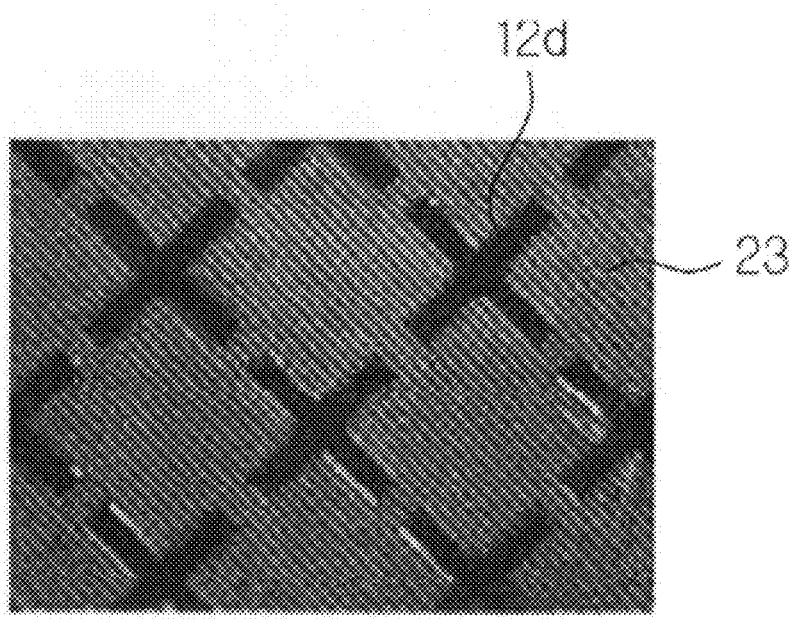
Figure 5C:
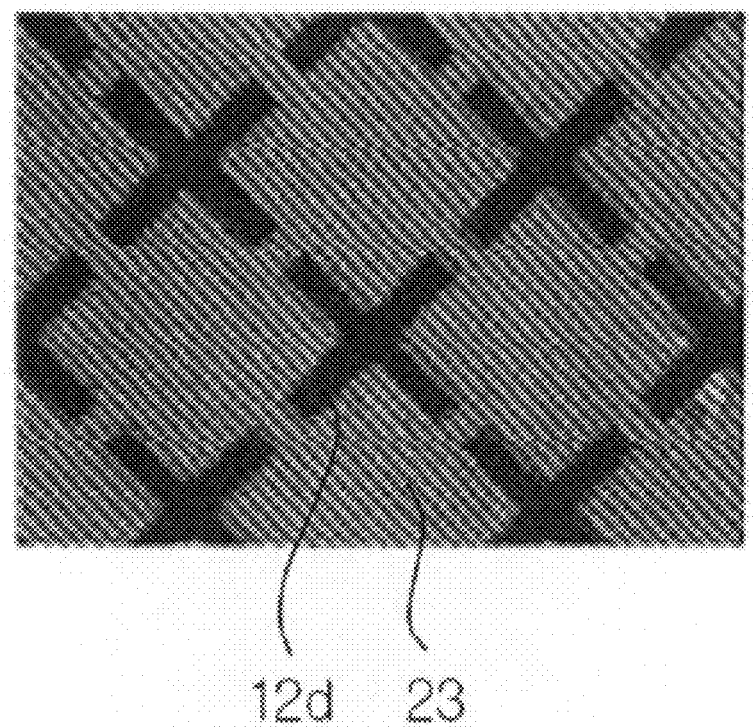
Figure 5D:
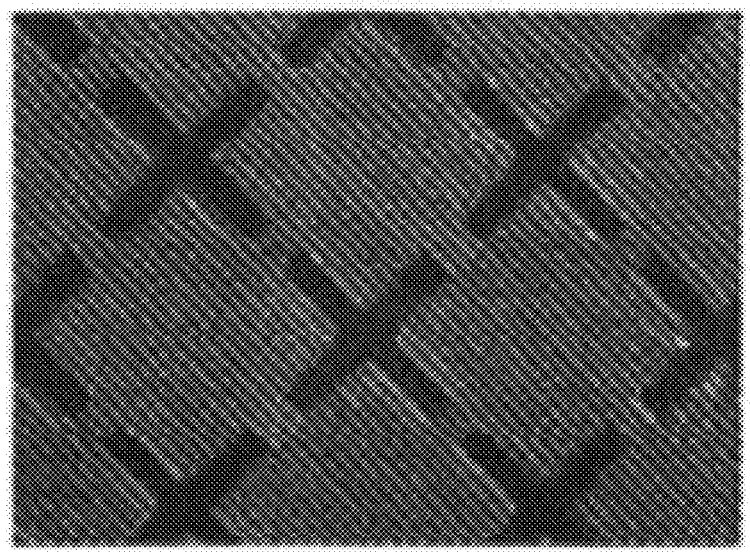

A flexible display device manufactured as described above was compared with a conventional flexible display device including a plastic substrate instead of a multifunction film, as described above. FIGS. 4A and 4B respectively illustrate photographs of a conventional flexible display device and an exemplary flexible display device according to an exemplary embodiment of the invention, in a state in which the conventional flexible display device and the exemplary flexible display device are bent by fingers.

As may be observed from FIGS. 4A and 4B, the flexibility of the flexible display device illustrated in FIG. 4B may be greater and more stable than that shown in FIG. 4A.

Next, characteristics of light transmittance of the LCD shown in FIGS. 1-3 will be described in detail with reference to FIGS. 5-12.

FIGS. 5A-5D, 7A-7D, 9A-9D and 11A-11D illustrate optical microscope images of flexible LCDs from above line A-A of FIG. 1 according to embodiments of the invention while subjected to various voltages, and FIGS. 6, 8, 10 and 12 illustrate graphs of voltage-to-luminance curves corresponding to the flexible LCDs shown in FIGS. 5A-5D, 7A-7D, 9A-9D and 11A-11D.

In the exemplary embodiments illustrated in FIGS. 5A-5D and 7A-7D, the electrodes 23 have a rectilinear structure extending parallel to each other along a given direction. In the embodiments illustrated in FIGS. 5A-5D and 7A-7D, a height H of the projections 12d was about 12.5 microns, a width of the electrodes 23 along a direction perpendicular to the direction along which the electrodes 23 extend was about 10 microns, and a distance between the electrodes 23 was about 10 microns.

In the multifunction film 12 of the flexible LCD shown in FIG. 5A-5D, the size D of the indentations was about 250 microns, and the width L of the projections was about 48 microns. In the multifunction film 12 of the flexible LCD shown in FIG. 7, the size D of the indentations was about 125 microns, and the width L of the projections was about 24 microns.

In the above-described exemplary LCDs illustrated in FIG. 1, the LC molecules in the LC layer 40 were initially aligned substantially perpendicularly, i.e., vertically, relative to the optic axes A and P of the polarizers 11 and 21. When, e.g., two adjacent ones of the electrodes 23 are supplied with voltages to generate an electric field, as discussed above, the LC molecules may re-orient themselves to be substantially parallel to the surface 22a of the substrate 22, making an angle of about 45 degrees with the optic axes of the polarizers 11 and 21, such that the light passes through the LCDs.

FIGS. 5A-5D illustrate photographs of an exemplary LCD from above line A-A of FIG. 1 at voltage differences of about 0V, 4V, 5V and 8V, respectively, between the two adjacent ones of the electrodes 23, and FIGS. 7A-7D illustrate photographs of an exemplary LCD from above line A-A of FIG. 1 at voltage differences of about 0V, 4V, 5V and 6V, respectively, between the two adjacent ones of the electrodes 23.

As can be understood from the optical states illustrated in FIGS. 5A-5D and 7A-7D, flexible LCDs employing one or more aspects of the invention may have excellent optical transmittance characteristics. Such improved optical transmittance characteristics may result from, e.g., an ability of the projections 12d of a geometrical structure of a multifunction film to maintain a space having a uniform height between a first panel and a second panel of an LCD.

Although an initial arrangement of the liquid crystal molecules in the liquid crystal layer 40 when no applied electric field is present may be a little unstable near the geometrical structure of the multifunction film having the exemplary embodiment illustrated in FIGS. 5A-5D and 7A-7D, the instability may be overcome. For example, the instability may be overcome by making the electrodes 23 opaque, by making the geometric structure of the multifunction film smaller than the opaque electrodes 23 and/or arranging and/or aligning the geometric structure of the multifunction film on the electrodes 23 in a manner such that light leakage caused by the distorted alignment of the liquid crystal molecules may be blocked by the opaque electrodes 23 to yield uniform optical characteristics. For example, in embodiments of the invention, the projections 12d of the multifunction film 12 may have dimensions smaller than the electrodes 23 such that the projections 12d substantially or completely overlap electrodes 23 formed of opaque material.

Figure 6:
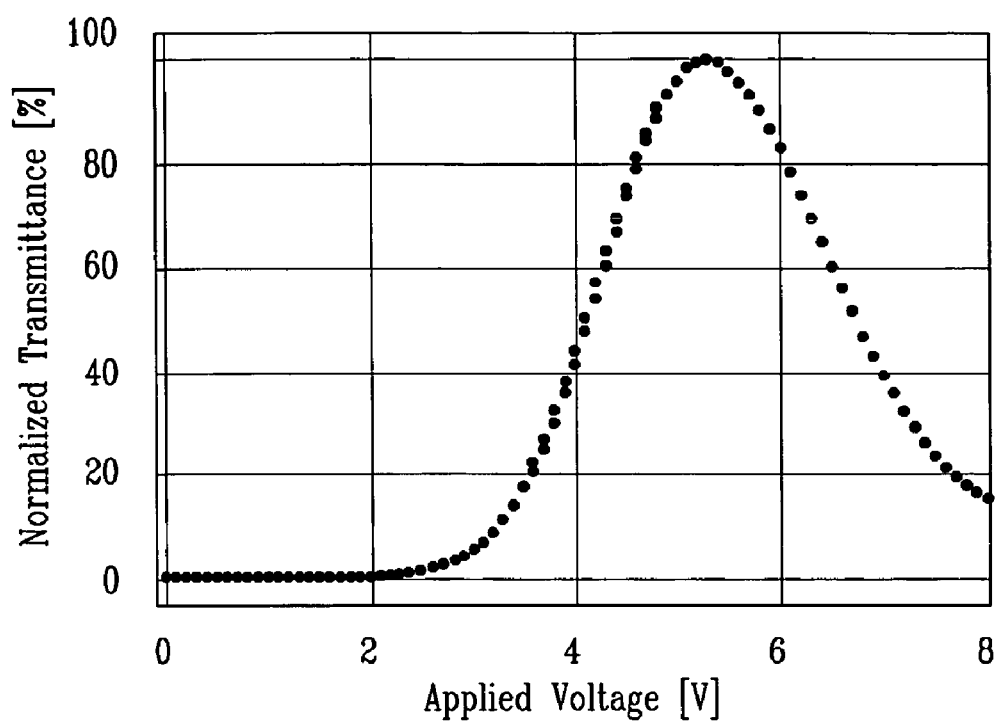
FIGS. 6, 8, 10 and 12 illustrate graphs of voltage-to-luminance curves corresponding to the flexible LCDs shown in FIGS. 5A-5D, 7A-7D, 9A-9D and 11A-11D.
Figure 7A:
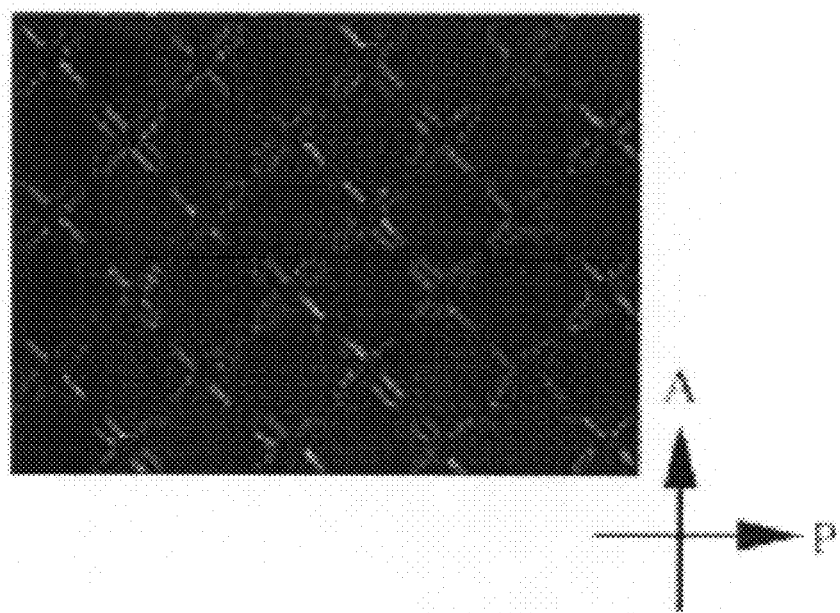
Figure 7B:
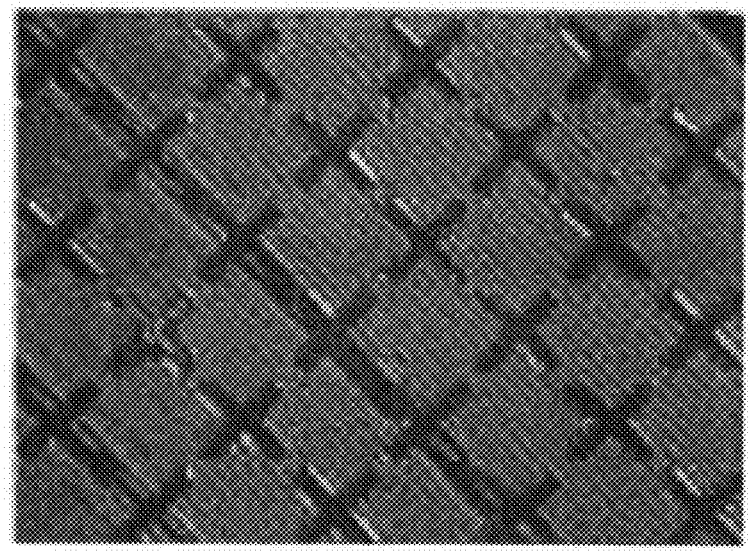
Figure 7C:
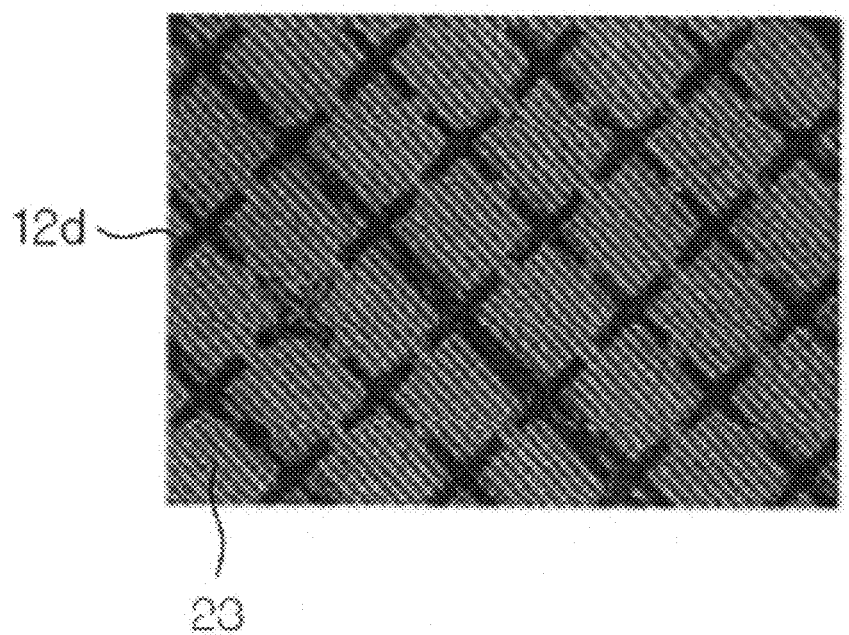
Figure 7D:
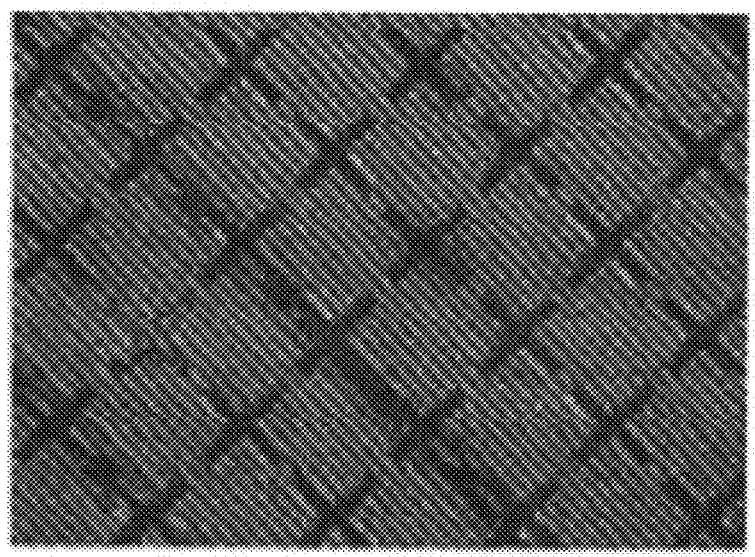
Figure 8:
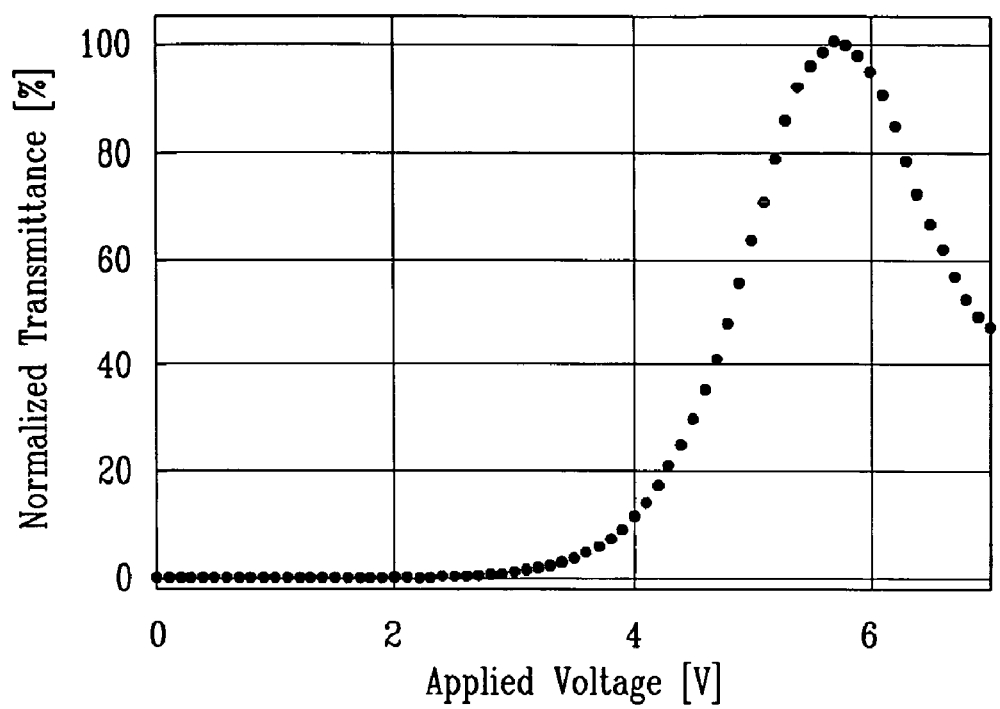
Figure 9A:
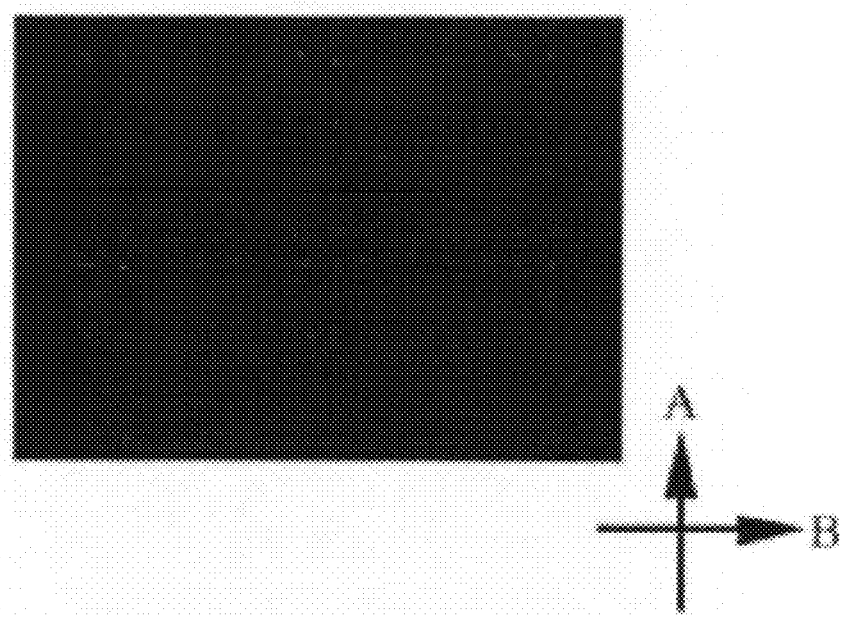
Figure 9B:
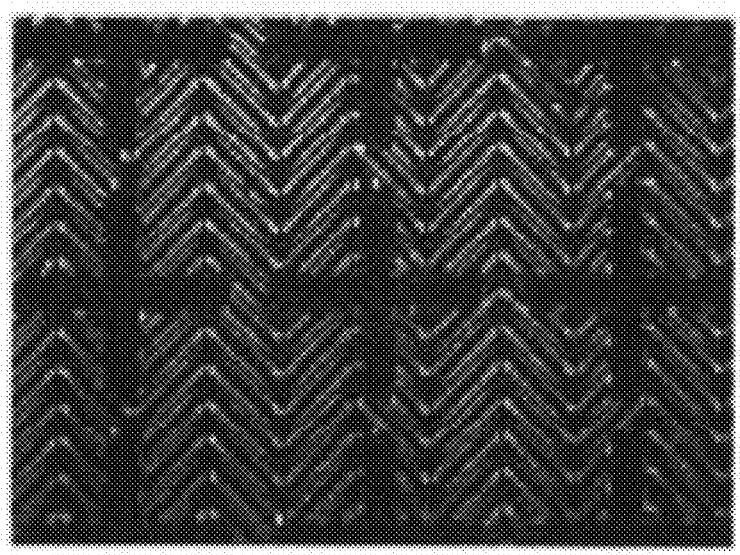
Figure 9C:
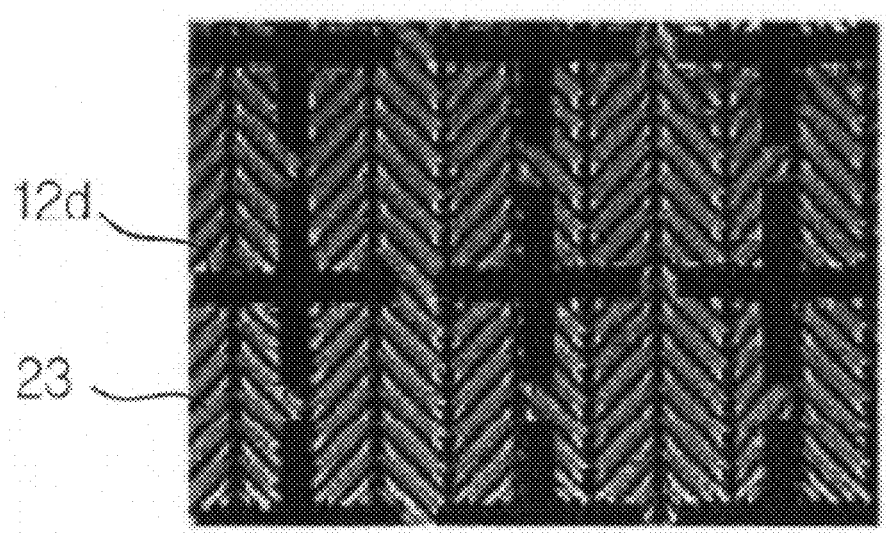
Figure 9D:
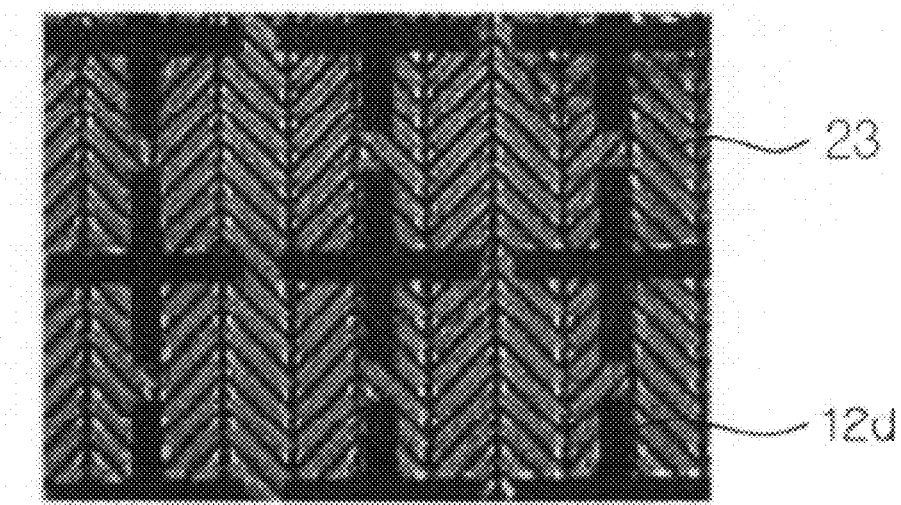

Referring to FIG. 6, corresponding to the structure illustrated in FIGS. 5A-5D, light begins to be transmitted at a voltage difference of about 3V, and transmittance of the light reaches a maximum at a voltage difference of about 5V. Referring to FIG. 8, corresponding to the structure illustrated in FIGS. 7A-7D, light begins to be transmitted at a voltage difference of about 3V, and transmittance of the light reaches a maximum at a voltage difference of about 5V. Because a variation in dimensions of the geometrical structure of the multifunction film may hardly affect characteristics of light transmittance, optical stability may be maintained irrespective of a geometrical structure of a surface 12a of the multifunction film 12.

In the exemplary embodiments illustrated in FIGS. 9A-9D and 11A-11D, the electrodes 23 have a chevron shape, i.e., inverted v-like shape, and extend parallel to and/or perpendicular to other ones of the electrodes 23. In the exemplary embodiments illustrated in FIGS. 9A-9D and 11A-11D, a width of the electrodes 23 was about 15 microns, and a distance between the electrodes 23 was about 15 microns.

In the multifunction film 12 of the flexible LCD illustrated in FIG. 9, a size D of indentations 12c was about 250 microns, a height H of projections 12d was about 12.5 microns, and a width L of the projections 12d was equal to about 48 microns. In the multifunction film 12 of the flexible LCD shown in FIG. 11, a size D of indentations 12c was about 125 microns, a height H of projections 12d was equal to about 6 microns, and a width L of the projections 12d was about 24 microns.

FIGS. 9A-9D illustrate photographs of an exemplary LCD from above line A-A of FIG. 1 at voltage differences of about 0V, 8V, 12V and 14V, respectively, between two adjacent ones of the electrodes 23. FIGS. 11A-11D illustrate photographs of an exemplary LCD from above line A-A of FIG. 1 at voltage differences of about 0V, 10V, 15V and 17V, respectively, between two adjacent ones of the electrodes 23.

In the flexible LCDs illustrated in FIGS. 9A-9D and 11A-11D, because the electrodes 23 in respective columns of the chevron shaped structure may be substantially parallel to each other, the LC molecules in the LC layer 40 may tilt in two azimuthal directions. The various azimuthal tilt directions of the LC molecules may improve viewing characteristics of LCDs. Arrows A and B illustrated in FIGS. 9A-9D and 11A-11D denote optic axes of the polarizers 11 and 21.

Figure 10:
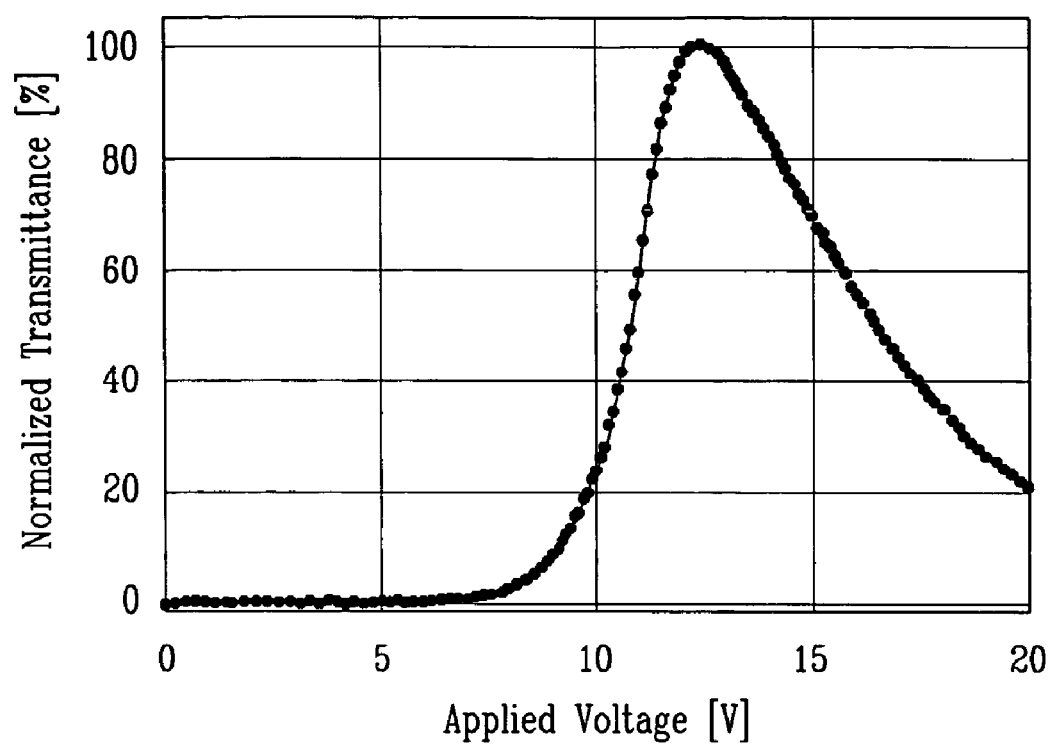
Figure 11A:
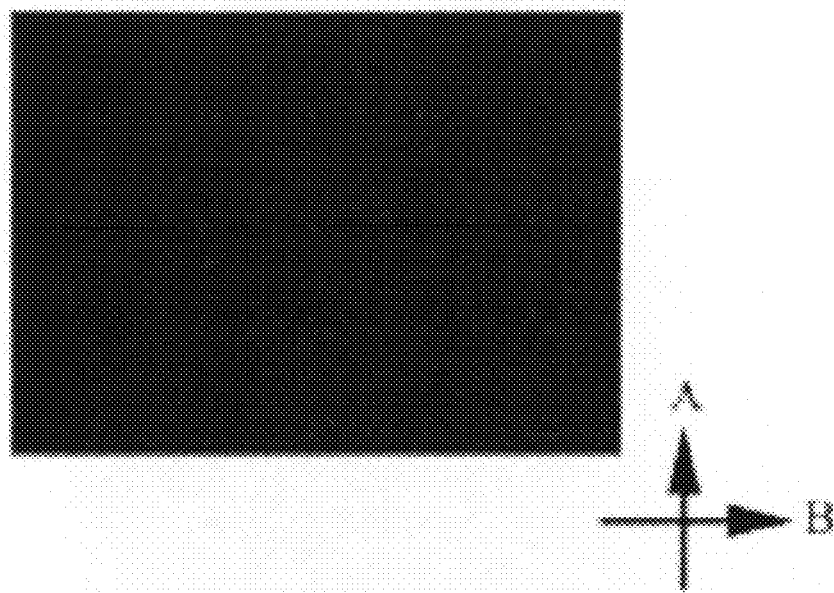
Figure 11B:
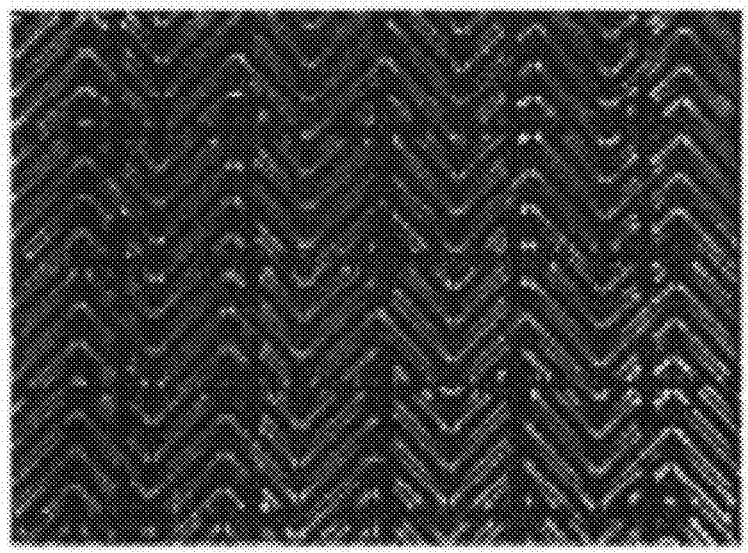
Figure 11C:
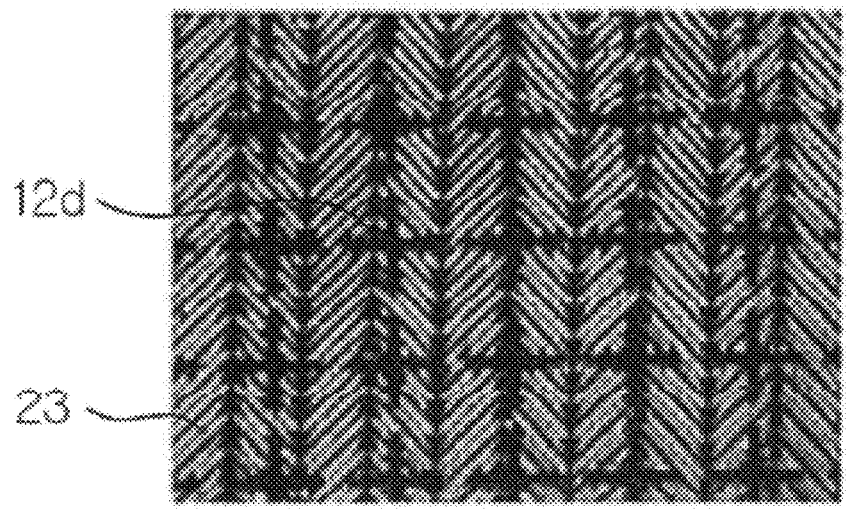
Figure 11D:
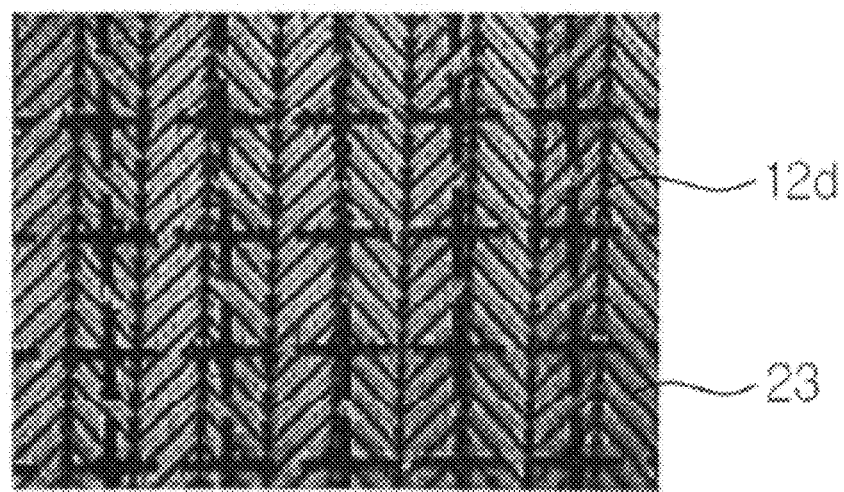
Figure 12:
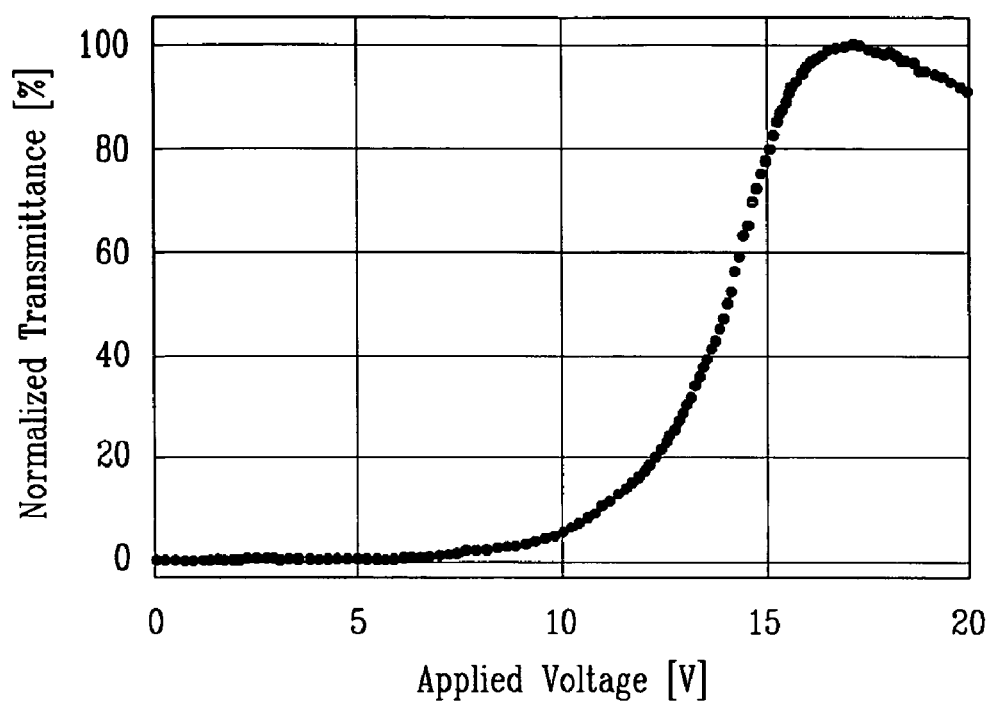

Referring to FIG. 10, corresponding to the structure illustrated in FIGS. 9A-9D, because the distance between adjacent ones of the electrodes 23 is about 15 microns, light begins to be transmitted at a voltage difference of about 8V, and transmittance of the light reaches a maximum at a voltage difference of about 12V. Referring to FIG. 12, light begins to be transmitted at a voltage difference of about 8V, and a transmittance of the light reaches maximum at a voltage difference of about 17V.

As described above, a shape and a size of the geometrical structure of the multifunction film 12 may be freely designed without changing the optical states of the display device. Embodiments of the invention are not limited to employing multifunction films having the exemplary structures illustrated in the accompanying Figures.

Embodiments of the above-described multifunction film may be utilized in any type of flat panel display, e.g., organic light emitting diode (OLED) display, LCD, etc. Thus, although in the above-description of exemplary embodiments, LCDs are illustrated in FIG. 1, one or more aspects of the invention may be similarly applied to any type of flat panel display device.

For example, with regard to OLED displays, which do not include a polarizer, but employ organic light emitting layers instead of the liquid crystal layer 40 employed in LCDs, the organic light emitting layers may be substituted instead of the liquid crystal layer 40 of LCDs. That is, in embodiments of the invention, any material having an optical property that can be varied by electrical stimuli may be substituted instead of the LC layer 40 of the LCDs, and may be contained within a space at least partially defined by a multifunction film according to embodiments of the invention.

As described above, flexible display devices according to embodiments of the invention, which include electro-optical active members, e.g., liquid crystal, may employ a multifunction film that simultaneously performs at least two functions. The multifunction film can be manufactured by a single process step, and may perform functions of, e.g., keeping a thickness of an electro-optical active layer, e.g., a liquid crystal layer, uniform, uniformly aligning molecules in the active layer, protecting the active layer from external impact, and being a flexible substrate.

In embodiments of the invention, the inherent elasticity of the multifunction film may provide excellent and stable flexibility as compared with a conventional flexible display device including a plurality of plastic substrates. The multifunction film according to embodiments of the invention may be manufactured by a mold without an expensive manufacturing device, thereby simplifying the manufacturing process and reducing the manufacturing cost.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A flexible display device, comprising:
a first panel including a multifunction film and a first polarizer, the multifunction film being a single layer of a same material and including a plurality of projections and at least one indentation, and the first polarizer being directly on an outer surface of the multifunction film;
a second panel arranged facing the multifunction film of the first panel with a gap therebetween, the second panel including a substrate and electrodes formed on the substrate, the gap being defined by the multifunction film and a surface of the second panel facing the first panel; and an electro-optical active layer disposed in the gap between the first panel and the second panel, the multifunction film being adapted to maintain a uniform thickness of the electro-optical active layer.

2. The flexible display device as claimed in claim 1, wherein:
the multifunction film aligns molecules in the electro-optical active layer and is a flexible substrate;
the gap between the second panel and the multifunction film is defined by the plurality of projections and the at least one indentation and the surface of the second panel facing the first panel; and
the plurality of projections of the multifunction film maintains the uniform thickness of the electro-optical active layer.

3. The flexible display device as claimed in claim 2, wherein the multifunction film comprises a surface facing the second panel and having a geometrical structure.

4. The flexible display device as claimed in claim 3, wherein the geometrical structure includes the plurality of projections and at least one indentation, the thickness of the electro-optical active layer being defined by a height of the projections.

5. The flexible display device as claimed in claim 4, wherein:
a height of each projection is substantially uniform, and
the electro-optical active layer substantially fills the gap.

6. The flexible display device as claimed in claim 5, wherein each of the projections is rectilinear and partitions the indentation adjacent thereto.

7. The flexible display device as claimed in claim 3, wherein the geometrical structure is a replica.

8. The flexible display device as claimed in claim 7, wherein the material of the multifunction film comprises polydimethylsilioxane (PDMS).

9. The flexible display device as claimed in claim 7, wherein the material of the multifunction film comprises a thermosetting resin or a light curable resin.

10. The flexible display device as claimed in claim 2, wherein the multifunction film is an inner surface of the first panel.

11. The flexible display device as claimed in claim 1, wherein the electro-optical active layer comprises a material having an optical property that varies by an external stimulus.

12. The flexible display device as claimed in claim 1, wherein the multifunction film is in contact with the surface of the second panel.

13. The flexible display device as claimed in claim 1, wherein the first polarizer and the multifunction film are sequentially stacked, and the multifunction film is between the first polarizer and the electro-optical active layer.

14. A flexible display device, comprising:
an alignment film, the alignment film being a single layer of a same material and having an inner surface including a projection and an indentation;
a first polarizer directly on an outer surface of the alignment film;
a first panel facing the alignment film with a gap between the first panel and the alignment film, the gap being defined by the alignment film and a surface of the first panel facing the alignment film, the first panel including:
a flexible substrate, and
a plurality of electrodes disposed on the flexible substrate; and
an electro-optical active layer disposed in the gap between the alignment film and the first panel, the thickness of the electro-optical active layer being defined by a height of the projection of the alignment film,
wherein the alignment film determines orientations of molecules in the electro-optical active layer.

15. The flexible display device as claimed in claim 14, wherein:
the projection of the alignment film is in contact with the surface of the first panel, and
the electro-optical active layer substantially fills the gap.

16. A flexible display device, comprising:
a protection film, the protection film being a single layer of a same material and having an inner surface comprising a projection and an indentation;
a first polarizer directly on an outer surface of the protection film;
a first panel facing the protection film with a gap between the first panel and the protection film, the gap being defined by the indentation of the protection film and a surface of the first panel facing the protection film, the first panel including:
a flexible substrate, and
a plurality of electrodes disposed on the flexible substrate; and
an electro-optical active layer disposed in the gap between the protection film and the first panel, the thickness of the electro-optical active layer being defined by a height of the projection of the protection film,
wherein the protection film covers and protects the electro-optical active layer.

17. The flexible display device as claimed in claim 16, wherein the material of the protection film comprises a thermosetting resin or a light curable resin.

18. The flexible display device as claimed in claim 16, wherein the material of the protection film comprises polydimethylsilioxane (PDMS).

19. The flexible display device as claimed in claim 16, wherein the electrodes are at least one of arranged in stripes and in an inverse v-shaped form.

20. The flexible display device as claimed in claim 16, wherein the protection film completely overlaps with the electrodes.

21. The flexible display device as claimed in claim 16, wherein the electrodes comprise an opaque material.

22. The flexible display device as claimed in claim 16, wherein the electro optical active layer comprises liquid crystal.

23. The flexible display device as claimed in claim 16, wherein:
the projection of the protection film is in contact with the surface of the first panel, and
the electro-optical active layer substantially fills the gap.

* * * * *